United States Patent [19]
Grudic et al.

[11] Patent Number: 5,293,461
[45] Date of Patent: Mar. 8, 1994

[54] SYSTEM FOR DETERMINING MANIPULATOR COORDINATES

[75] Inventors: Gregory Z. Grudic, Richmond; Peter D. Lawrence, Vancouver, both of Canada

[73] Assignee: The University of British Columbia, Vancouver, Canada

[21] Appl. No.: 794,953

[22] Filed: Nov. 20, 1991

[51] Int. Cl.⁵ .............................................. G05B 19/00
[52] U.S. Cl. ......................................... 395/97; 395/98
[58] Field of Search ................................... 395/97, 98

[56] References Cited

U.S. PATENT DOCUMENTS 4,887,222 12/1989 Miyake et al. .......................... 395/87

*Primary Examiner*—Allen R. MacDonald
*Attorney, Agent, or Firm*—C. A. Rowley

[57] ABSTRACT

An inverse kinematics method of determining joint variables for a manipulator is obtained by forming a model by modifying offset values of a selected arm segments of the manipulator to define a model for which it is possible to derive closed-form inverse kinematics equations for solving the joint variables for said model, developing from said closed-form inverse kinematics equations a system of not more than 3 non-linear equations in not more than 3 unknowns which when solved give an inverse kinematics solution for the model, solving the system of at most 3 non-linear equations to provide the inverse kinematic solution for said manipulator to determine its joint variables.

20 Claims, 4 Drawing Sheets

SYSTEM FOR DETERMINING MANIPULATOR COORDINATES

FIELD OF THE INVENTION

The present invention relates to a method for determining manipulator joint coordinates by facilitating the solving of a manipulator inverse kinematics problem for a robot manipulator to obtain the required manipulator joint variable values for a given desired endpoint position, endpoint orientation and manipulator configuration. The invention is particularly suited for manipulators for which closed-form inverse kinematics solutions are not readily available.

BACKGROUND OF THE PRESENT INVENTION

Closed-form inverse kinematics equations may be derived for many types of manipulators which make the inverse kinematics solutions for the joint variables for these manipulators relatively simple to calculate.

With 6 degree of freedom (DOF) manipulators, closed-form inverse kinematics equations can often be derived when any three adjacent joints of the manipulator are either intersecting or parallel to one another. The theory for 7 DOF manipulators is not as well understood, however it is possible to derive closed-form equations for many manipulators which resemble the human arm.

Non-closed-form methods for determining joint coordinates of a manipulator via the inverse kinematics are also known. Generally all of these methods involve numerically iterating to within a maximum allowable error of the desired solution, and are usually intended to be used on manipulators which may not have closed-form inverse kinematics equations.

Wang and Chen describe a combined optimization method which they state can be used on any manipulator geometry (see Int. J. Robot. Res., 7(4):pages 489-499, August 1991). This method uses the cyclic coordinate descent method to find an initial estimate of the desired solution and then uses the Broyden-Fletcher-Shanno variable metric method to find a solution which is within the maximum tolerable error. The method is applicable to manipulators of arbitrary number of degrees of freedom, has guaranteed global convergence, and is not sensitive to manipulator singularities.

Tsai and Morgan in Trans. ASME J. Mech. Transmiss., Automat. Des., 107(2): 189-200, June 1985 describe a method which is applicable to general six- and five-DOF manipulators and which can generate all possible solutions for a desired endpoint position and orientation. This was achieved by converting the problem into a system of 8 second order equations in 8 unknowns and then solving this system for all possible solutions, by continuation methods.

Lee and Liang in Mech. Mach. Theory, 23(7): 219-226, 1988 describe a general method for solving the inverse kinematics problem for 6 DOF manipulators with rotational joints. This method involves deriving a 16th order polynomial equation in the tan-half-angle of the first joint ($\theta_1$), and then (for each desired endpoint position and orientation) numerically solving for all of the zeroes of this polynomial equation. All the real roots obtained represent a viable joint angle value for $\theta_1$ while the other five joint variable values are calculated using closed-form equations which are functions of $\theta_1$.

Takano describes an inverse kinematics method for 6 DOF manipulators which requires closed-form Inverse kinematics equations for the first 3 joints in terms of the endpoint position of the third line (see Journal of the Faculty of Engineering, The University of Tokyo (B), 38(2): 107-135, 1985. It also requires closed-form inverse kinematics equations for the last 3 links in terms of the orientation of the final link. Endpoint position and endpoint orientation are then solved for separately, one after the other in an iterative manner, until convergence is obtained to within the required accuracy.

Manseur and Doty in Int. J. Robot. Res., 7(3): 52-63, June 1988 teach a fast algorithm which can be used with 6 DOF manipulators that have revolute joints at the first and last links, and for which one is able to derive closed-form equations for joint variables 2 through 6 as a function of joint variable 1. Under these conditions, it is shown that a single non-linear equation can be generated with the only unknown being joint variable 1. This equation is then solved using the Newton-Raphson method.

In IEEE Trans. Robotics and Automat., 5(5): 555-568, October 1989 Tourassis and Ang describe a fast method which is applicable to general 6 DOF geometries. The method is based on creating a system of 3 non-linear equations in 3 unknowns which represent the Cartesian position of the wrist. Conditions under which the method will converge are given and the desired manipulator configuration can be easily specified. The algorithm is also applicable for real time use.

Other methods which have been extensively used to solve the inverse kinematics problem are called Inverse Jacobian Methods and are based upon Newton algorithms which are used to solve systems of non-linear equations. The non-linear equations are usually derived from expressions in which the desired endpoint position and orientation are functions of the manipulator's joint variables (i.e. forward kinematics equations). These methods work by linearizing the system of equations using a Taylor's series expansion around the manipulator's initial position (i.e. calculating the Jacobian of the forward kinematics equations). This system of linear equations, when solved, provides an approximation to the joint variable values which give the desired endpoint position and orientation. Inverse Jacobian methods are generally applicable to all manipulator geometries, including redundant manipulators, and can be suitable for real time control.

Some Newton-based algorithms use damped least-squares methods to compensate for problems that are associated with Jacobian singularities. Nakamura in his PhD thesis "Kinematical Studies on the Trajectory Control of Robot Manipulators", Kyoto, Japan, June 1985 describes a method wherein damping factor is increased as the manipulator approached a Jacobian singularity region. U.S. Pat. No. 4,893,254 issued Jan. 9, 1990 to Chan et al describes a system wherein the damping factor is a function of residual error to provide inverse kinematics control of manipulators near singularity regions. Hutchinson in his master thesis "Manipulator inverse kinematics based recursive least squares estimation", Dept. of Electrical Eng., University of British Columbia, December 1988 showed that a least-squares approximated Jacobian used in a Newton-Raphson type algorithm has similar convergence properties to the damped least-squares method.

Novakovic and Nemec in "A solution to the inverse Kinematics Problem Using the Sliding Mode", IEEE Trans.Robotics and Automat, 6(2): 247-252, April 1990 developed an algorithm based on sliding mode control and Lyapunov theory. The algorithm is tested on a 4 axis manipulator which has no known closed-form solutions to its inverse kinematics. The method is indicated as being computationally more efficient than Newton based methods and not as prone to singularity problems.

Powell "A Hybrid Method for Nonlinear Equations". In P. Rabinowitz, editor, "Numerical Methods for Nonlinear Algebraic Equations, pages 87-114. London, UK: Gordon and Breach, 1970 developed a hybrid algorithm for solving systems of linear equations which uses the Newton-Raphson method, the gradient descent method, and a combination of the two. The combination of these three algorithms give Powell's hybrid algorithm, in general, better convergence properties than most other non-linear equation solving algorithms. This inverse kinematics formulation is applicable to general manipulator geometries, allows real time control, and has better convergence properties than methods that are based solely on the Newton-Raphson approach.

Another approach to the inverse kinematics problem involves the integration of joint velocities which are obtained using inverse Jacobian techniques. Tsai and Orin "A Strictly Convergent Real-time solution for Inverse kinematics of Robot Manipulators", J. Robotic Syst., 4(4): 477-501, August 1987 used a variation of this approach along with a special-purpose inverse kinematics processor to obtain a system that works in real time. This method has good convergence properties in that it usually only fails to converge in manipulator singularity regions.

None of the above methods simultaneously
1. guarantees convergence to a desired endpoint position and orientation if it exists;
2. is applicable to real-time manipulator control;
3. gives direct control over the manipulator's configuration; and
4. is applicable to manipulators of arbitrarily many degrees of freedom.

BRIEF DESCRIPTION OF THE PRESENT INVENTION

It is an object of the present invention to provide a simple and fast method of obtaining inverse kinematic solutions for joint values for robot arms with multiple degrees of freedom and is particularly suited to robot configurations for which closed-form solutions are not generally available.

Broadly the present invention relates to a method of determining joint variables for a manipulator comprising forming a model by modifying offset length values of selected arm segments of said manipulator to define a model for which it is possible to derive closed-form inverse kinematics equations for solving the joint variables for said model, developing from said closed-form inverse kinematics equations a system of not more than 3 non-linear equations in no more than 3 unknowns which when solved give an inverse kinematics solution for the model, solving said system of not more than 3 non-linear equations to calculate the inverse kinematic solution for said model, said joint variables of said model defining said joint variables of said manipulator.

Preferably said modifying offset values of selected arm segments comprises setting said offset length values of said selected arm segment to zero to define said model.

Preferably said solving iteratively solves for $p_m$ (model end point position) within a sphere centered at $p_{rd}$ (target end point position of the manipulator) having a radius $\Delta p_{max}$ $$\Delta p_{max} = \max_{q} \{ \| \Delta p(q,c) \| \}. \quad (10)$$

where
$q$ = a vector containing the joint variable values of both the real and the model manipulators.
$c$ = represents the manipulator configuration.
$\Delta p$ = difference between the endpoint position of the model manipulator and the real manipulator given that both have identical joint angle values.

Preferably for a real manipulator having 6 DOF the model will have 6 DOF with 3 adjacent intersecting joint axes that give 3 independent degrees of freedom to form a model manipulator that has closed-form solutions.

Preferably said system of 3 non-linear equations in 3 unknowns is $$p_m = [p_{mx} \, p_{my} \, p_{mz}] = p_{rd} + \Delta p(k_m^{-1}([n_{rd} \, s_{rd} \, a_{rd} \, p_m]^T, c))$$

where
$p_m$ = endpoint position of the model manipulator when the real and model manipulators have the same joint values.
$k_m^{-1}$ = the closed form inverse kinematics equivalent of the model manipulators
$n = [n_x \, n_y \, n_z]$,
$s = [s_x \, s_y \, s_z]$
$a = [a_x \, a_y \, a_z]$ and
n, s and a = orthonormal vectors which uniquely define the orientation of the manipulator's distal link,
$p_{rd} = [p_{rx} \, p_{ry} \, p_{rz}]$ the desired Cartesian endpoint position of the real manipulator
c = vector defining the desired arm configuration
subscript m = model manipulator values, and
subscript r = real manipulator values.
subscript d = desired or target values as set by input command
$\Delta p$ = difference between the endpoint position of the model manipulator and real manipulator given that both have identical joint variable values.

Preferably the manipulator is a 6 DOF manipulator not having a closed-form solution and in which all the distal joints 4, 5 and 6 are
a) rotational
b) non-parallel (i.e. $a_{r4} \neq 0°$ or $\pm 180°$ and $a_{r5} \neq 0°$ or $\pm 180°$))

and wherein said model has
a) joint variables for joints 1, 2 and 3 (starting with joint 1 at the base) give three degrees of freedom for the cartesian positioning of joint 4
b) joints i = 1, 2, 3 and 6 are set on the basis that Denavit-Hartenberg joint parameters of said model equal those of said manipulator ($a_{mi} = a_{ri}$, $a_{mi} = a_{ri}$, $d_{mi} = d_{ri}$, and $\theta_{mi} = \theta_{ri}$) and
c) Denavit-Hartenberg joint parameters for joints 4 and 5 are set so that (for i = 4, 5)

$$a_{mi} = a_{ri}; \quad a_{mi} = 0;$$

$$d_{mi} = \begin{cases} d_{ri} & i=4 \\ 0 & i=5 \end{cases} \quad \theta_{mi} = \theta_{ri}$$

BRIEF DESCRIPTION OF THE DRAWINGS

Further features, objects and advantages will be evident from the following description of the preferred embodiments of the present invention taken in conjunction with the accompanying drawings in which.

DESCRIPTION OF THE PREFERRED EMBODIMENTS

Figure 1:
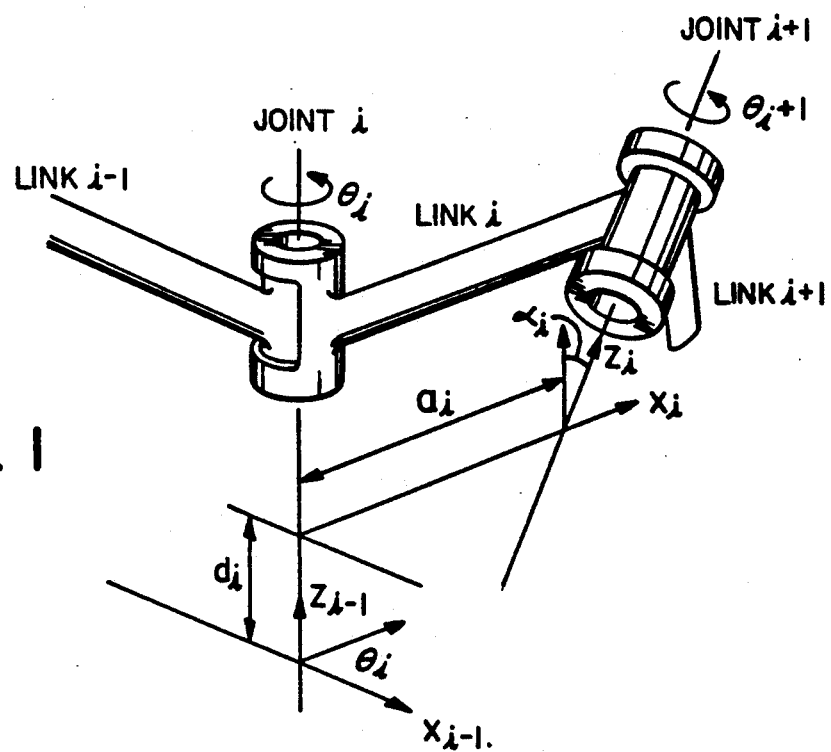
FIG. 1 is a schematic illustration of 3 adjacent arms of a robot to illustrate the Denavit-Hartenberg parameter as used herein.
Figure 2:
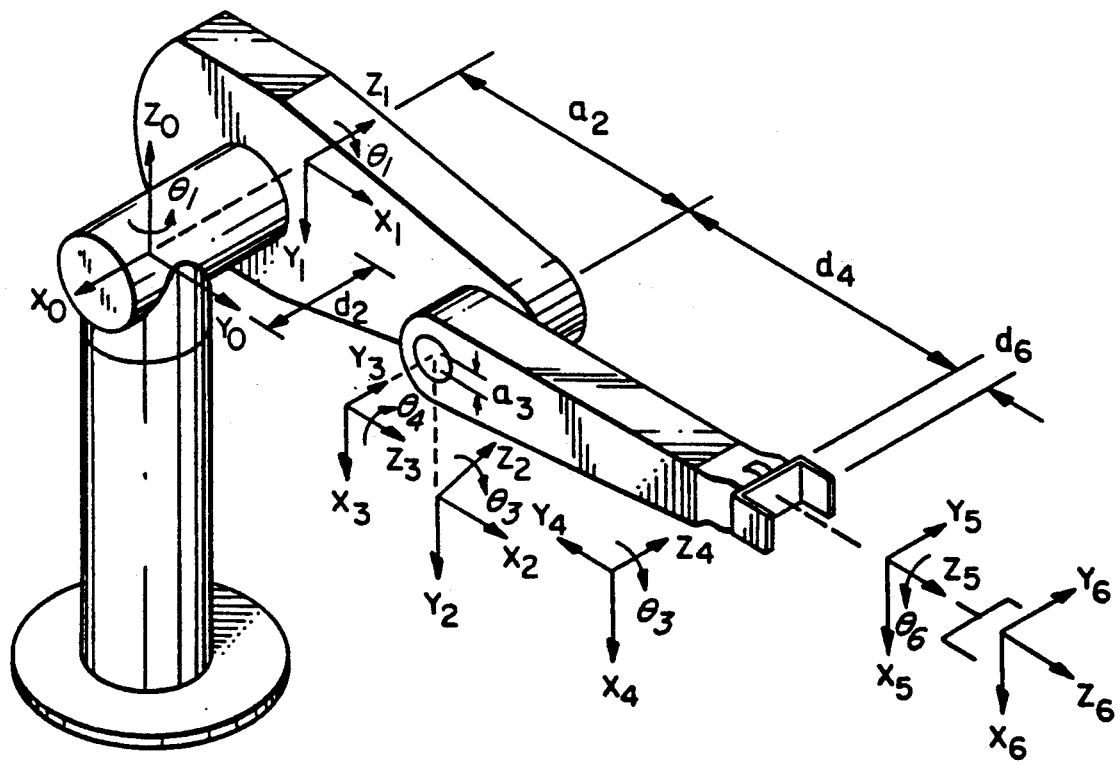
FIG. 2 is a schematic illustration of a robot having 6 DOF further illustrating the designations used herein.

In the following description the well known Denavit-Hartenberg representations are used to formulate the forward kinematics equations for robot manipulators. This representation is based on the four geometric parameters $a_i$, $d_i$, $\alpha_i$ and $\theta_i$ which are illustrated in FIG. 1 and are used in homogeneous transformation matrices to describe the geometric relationship between link $(i-1)$ and link $i$.

These four parameters are for any link i are defined as follows;

$a_i$ = the offset distance from the intersection of the $z_{i-1}$ axis with the $x_i$ axis to the origin of the ith link along the $x_i$ axis (or the shortest distance between the $z_{i-1}$ and $z_i$ axes i.e. the length of the link i).

$d_i$ = the distance from the origin of the $(i-1)$th coordinate frame (link$_{i-1}$) to the intersection of the $z_{i-1}$ axis with the $x_i$ axis along the $z_{i-1}$ axis.

$\alpha_i$ = the offset angle from the $z_{i-1}$ axis to the $z_i$ axis about the $x_i$ axis.

$\theta_i$ = joint angle from the $x_{i-1}$ axis to the $x_i$ axis about the $z_{i-1}$ axis (using the right hand rule).

See Fu, Gonzalez and Lee, "Robotics: Control, Sensing, Vision and Intelligence" McGraw-Hill, New York, N.Y., 1970 for further details.

The subscripts m and r are used hereinbelow to indicate parameters of a model manipulator and the real manipulator respectively and the numerals 1, 2, 3, etc. the joint numbers starting from the base end.

Building manipulators which have closed-form inverse kinematics equations is desirable because iterative inverse kinematics methods often do not allow direct control over the manipulator's configuration and are not guaranteed to converge to the desired solution. The two main disadvantages of building manipulators which do have closed-form inverse kinematics equations is that they can be hard to manufacture and they often have less dexterity than manipulators which have no known closed-form inverse kinematics equations. Thus, designing a manipulator which has closed-form inverse kinematics equations often greatly limits its practical use. One goal of the present invention is to allow one to build a manipulator which has no known closed-form inverse kinematics equations, while at the same time maintaining essentially the same level of inverse kinematics control over the manipulator, as is possible with closed form inverse kinematics equations.

This is accomplished by the present invention in 3 steps, namely:

1. first design a manipulator such which has closed-form inverse kinematics equations and simultaneously meets a required set of kinematic design goals,
2. then, add any desired offsets to this design to make it easier to fabricate and give it the desired range of motion, or dexterity, at each joint,
3. and finally, use the method of the present invention to obtain the inverse kinematics solution for the resulting manipulator.

Inverse kinematics solutions for model manipulators with more than 6 degrees of freedom require additional specifications in order to define all possible solutions. For an N DOF redundant manipulator, the $(N-6)$ redundancies can be specified using appropriately defined $(N-6)$ real variables; these will be termed redundancy variables. Using redundancy variables, it is possible to write closed-form inverse kinematics equations for many types of redundant manipulators. The desired redundancy variables values, which are specified as inputs to the inverse kinematics algorithm, can be considered to be part of the configuration vector c.

Thus, if one can reduce a real manipulator (including redundant manipulators) to a model manipulator (including a redundant model manipulator) which satisfies the following conditions 1. The only differences between the model and real manipulators are the values of the Denavit-Hartenberg parameters $a_i$ and $d_i$.
2. The model has closed-form inverse kinematics equations.
3. $q = q_m = q_r$.
4. For every endpoint position, orientation and manipulator configuration which lies in a singularity region of the model manipulator, there exists another endpoint position, which is arbitrarily close to the previous endpoint position, but which is not in a singularity region.

then one can formulate a solution to the inverse kinematics problem for he real manipulator. Therefore, as long as the real manipulator/model manipulator relationship is defined by the above conditions then regardless of number of degrees of freedom of the real manipulator, the theoretical framework presented herein may be used to solve the inverse kinematics for the real manipulator.

The advantages of this approach to solving the inverse kinematics problem particularly for redundant manipulators are:

1. Control over the endpoint position, endpoint orientation, manipulator configuration, and all redundancy variables is obtained. Such control is essential when the manipulators workspace is cluttered with obstacles that must be avoided.
2. The complexity of the problem never goes above that needed to solve a system of 3 equations in 3 unknowns. This allows for real time inverse kinematics calculations for redundant manipulators.
3. Control over redundancy variables allows manipulator singularities to be avoided.

A model manipulator for most real manipulators may be selected from manipulator forms that have known closed-form solutions. "The Kinematics of manipulators Under Computer Control" Pieper; PhD thesis, Computer Science Dept. Stanford University; October 1968 describes a number of manipulator configurations having closed-form solutions and showed that if any 3 consecutive joint axes (which must give three independent degrees of freedom) of a 6 DOF manipulator are intersecting, then closed-form inverse kinematic solutions can be defined for the manipulator. Thus by modifying the Denavit-hartenberg paraments $a_i$ and $d_i$ of the real 6 DOF manipulator to form a model manipulator with 6 DOF having 3 adjacent intersecting joint axes that give 3 independent degrees of freedom one defines a model manipulator that has closed-form solutions and with which the present invention may be used to determine the solution for the real manipulator.

Generally a model manipulator usable with the present invention (having a closed-form solution) is obtained for a real 6 DOF manipulator (not having a closed-form solution) which may be broadly defined as manipulators in which all the distal joints 4, 5 and 6 are a) rotational b) non-parallel (i.e. $a_{r4} \neq 0°$ or $\pm 180°$ and $a_{r5} \neq 0°$ or $\pm 180°$))

by having;

a) joint variables for joints 1, 2 and 3 (starting with joint 1 at the base) give three degrees of freedom for the Cartesian positioning of joint 4 b) joints i=1, 2, 3 and 6 are set on the basis that the Denavit-Hartenberg joint parameters of the model equal those of the real manipulator, i.e.

$$a_{mi}=a_{ri}; \; a_{mi}=a_{ri}; \; d_{mi}=d_{ri}; \text{and} \, \theta_{mi}=\theta_{ri}, \text{and}$$

c) the Denavit-Hartenberg parameters for joints 4 and 5 of the model are set so that $$a_{mi} = a_{ri}, \, i = 4,5 \quad a_{mi} = 0;$$

$$d_{mi} = \begin{cases} d_{ri} & i = 4 \\ 0 & i = 5 \end{cases} \quad \theta_{mi} = \theta_{ri}$$

The above defined conditions ensures that the manipulators endpoint has three DOF in Cartesian space and the wrist joints (4, 5 and 6) give three DOF in orientation.

The manner of selection of model manipulators for a real manipulator having greater than 6 DOF is not as easily defined as closed-form solutions for redundant manipulators have not yet been as thoroughly defined as those for 6 DOF manipulators. Nevertheless closed-form solutions have been proposed for some manipulators having greater than 6 DOF see for example; Hollerbach. Optimum kinematic design for seven degree of freedom manipulator. In Robotics Research; 2nd International Symposium, Kyoto, Japan, pages 215–222, August 1984. where closed-form inverse kinematic equations for two 7 DOF manipulators are given and the Denavit-Hartenberg parameters defined. Thus if the Denavit-Hartenberg parameters for a 7 DOF manipulator (for which a solution is desired) can be modified to create a model which is the same as one of the two defined by Hollerbach and if the resulting real manipulator/model manipulator relationship meets the conditions defined above, then the method of the present invention can be used on that manipulator.

As is well known the forward kinematics equations for manipulators may be given in the form of a single 12 element column vector:

$$k(q) = [n(q) s(q) a(q) p(q)]^T. \quad (1)$$

The vectors $n = [n_x \, n_y \, n_z]$, $s = [s_x \, s_y \, s_z]$ and $a = [a_x \, a_y \, a_z]$ are orthonormal vectors which uniquely define the orientation of the manipulator's distal link (the hand) and are respectively termed the normal vector, the sliding vector, and the approach vector of the hand. The vector $p = [p_x \, p_y \, p_z]$ defines the Cartesian endpoint position of the manipulator. The vector $q = [q_1 \, q_2 \cdots q_N]^T$, where N is the number of degrees of freedom of the manipulator, contains the joint variable values of the manipulator. For a prismatic joint i the joint variable is $d_i$ (i.e. $q_i = d_i$), and for a rotational joint i the joint variable is $\theta_i$ (i.e. $q_i = \theta_i$). The equations which give the vectors n, s a and p are derived using homogeneous transformation matrices ($^{i-1}A_i$):

$$\begin{bmatrix} n^T(q) s^T(q) a^T(q) p^T(q) \\ 0 \quad 0 \quad 0 \quad 1 \end{bmatrix} = {}^0A_1 \, {}^1A_2 \, {}^2A_3 \ldots {}^{N-1}A_N \quad (2)$$

The forward kinematics of the real or actual manipulator to be controlled will be referred to by the subscript r and are given by the following equations:

$$x_r = [n_r \, s_r \, a_r \, p_r]^T = k_r(q_r) = [n_r(q_r) \, s_r(q_r) \, a_r(q_r) \, p_r(q_r)]^T. \quad (3)$$

Similarly the forward kinematics equations of the model manipulator constructed as will be described below, referred to by the subscript m, are given by $$x_m = [n_m \, s_m \, a_m \, p_m]^T = k_m(q_m) = [n_m(q_m) \, s_m(q_m) \, a_m(q_m) \, p_m(q_m)]^T. \quad (4)$$

Where $x_r$ and $x_m$ are column vectors containing 12 scalars which define the endpoint position and orientation of the real and model manipulators respectively.

To practise the present invention the inverse kinematics solution for the model is obtained and the solution for the real manipulator is derived from the solution for the model by setting the joint variable values of the real manipulator to be equal to those of the model manipulator. This allows the formulation of a set of delta kinematics equations by subtracting the forward kinematics equations of the real manipulator from the forward kinematics equations of the model manipulator. The inverse kinematics solution for the model manipulator and the delta kinematics equations are then used to construct a non-linear system of 3 equations in 3 unknowns. The numerical solution of this system of equations for the model gives the desired solution to the inverse kinematics for the real manipulator which to define the endpoint position of the real manipulator requires modifying the endpoint of the model by the changes made to the real manipulator to define the model manipulator i.e. apply the offset changes made in forming the model to the solution for the model to define the endpoint position and orientation of the real manipulator.

The inverse kinematics of the model manipulator is given by $$q_m = k_m^{-1}(x_m, c). \quad (5)$$

Figure 3:
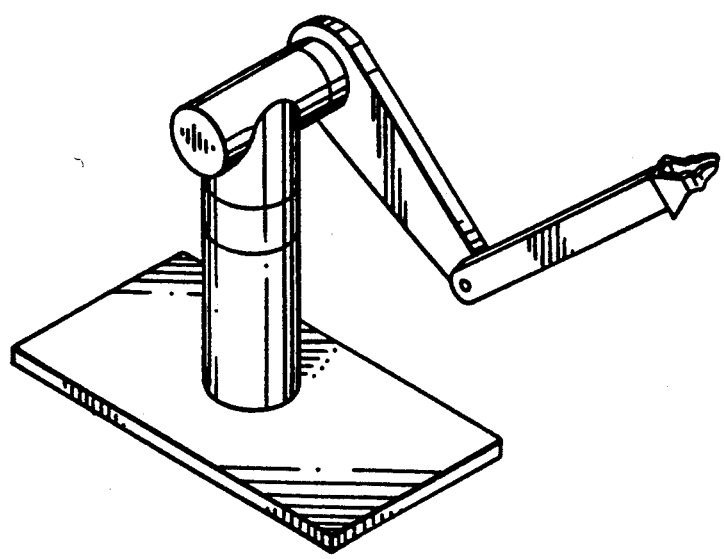
FIGS. 3 and 4 show examples of selected specific joint configurations.
Figure 4:
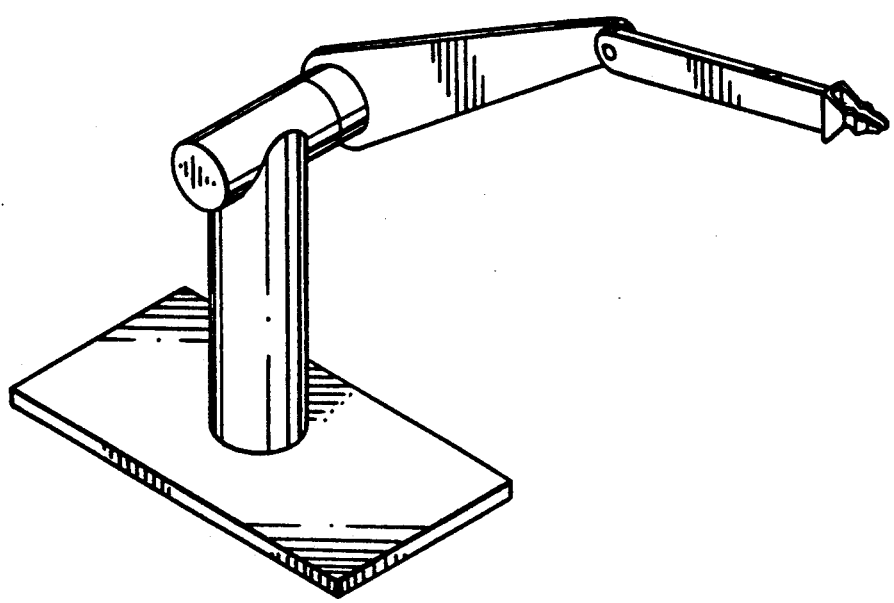

The vector c contains the desired configuration (eg. elbow up see FIG. 3 or elbow down see FIG. 4 or arm left or right etc.) that both the real manipulator and model manipulator are required to have. If the real manipulator is a redundant manipulator, then c must also contain enough variables to completely specify all redundancies.

As above indicated the joint variable values of the real manipulator are equal to the joint variable values of the model manipulator, i.e.

$$q = q_m = q_r \quad (6)$$

The delta kinematics equations ($\Delta k(q)$), which give the difference between the forward kinematics equations of the model manipulator and the forward kinematics equations of the real manipulator, are derived as follows:

$$\Delta k(q) = x_m - x_r \quad (7)$$
$$= k_m(q) - k_r(q)$$

$$= \begin{vmatrix} n_m(q) - n_r(q) & 0 \\ s_m(q) - s_r(q) & 0 \\ a_m(q) - a_r(q) & 0 \\ p_m(q) - p_r(q) & \Delta p(q) \end{vmatrix}$$

The first 9 entries in the column vector $\Delta k(q)$ are always zero because the real manipulator and the model manipulator always have identical endpoint orientations. Therefore $$[n_m s_m a_m]^T = [n_r s_r a_r]^T. \quad (8)$$

By substituting (5) into the system (7), the following system of 3 equations in 3 unknowns is obtained:

$$p_m = p_{rd} + \Delta p(k_m^{-1}([n_{rd} s_{rd} a_{rd} p_m]^T, c)). \quad (9)$$

The subscript d represents desired or target values (set by the operator), thus the only unknown in (9) is the 3 element row vector $p_m = [p_{mx}\ p_{my}\ p_{mz}]$ and in some cases some of these unknowns may also be known.

The unknown vector ($p_m$) represents the endpoint position of the model manipulator when the real manipulator and the model manipulator have identical joint variable values (i.e. $q_m = q_r$), and when the real manipulator is at the desired endpoint position ($p_r$), endpoint orientation ($n_r$, $s_r$, and $a_r$), and manipulator configuration (c). By numerically solving the system (9) for $p_m$ the joint variable values of the model manipulator, and therefore for the real manipulator are determined.

One important characteristic of the system of equations (9) is that the unknown vector, $p_m$, must lie within a sphere centred at $p_{rd}$, having a radius of $\Delta p_{max}$, where $$\Delta p_{max} = \max_q \{ \| \Delta p(q, c) \| \}. \quad (10)$$

Therefore, using the offset modification (OM) theoretical framework of the present invention, the N dimensional manipulator iterative inverse kinematics problem is converted to a bounded 3 dimensional iterative problem.

The system of equations (9) from the OM formulation can be solved using many different types of well known numerical techniques (see as examples Ortega and Rheinboldt "Iterative Solutions of Nonlinear Equations in several Variable", Academic Press, New York. N.Y. 1970 or the Novankovic or Powell references referred to hereinabove).

The preferred nonlinear equation solver is a hybrid of two different techniques and is designed to give fast and theoretically guaranteed convergence and incorporates as a first numerical technique, a technique called the Fixed Point Algorithm described in Ortega and Rheinboldt referred to above. The main feature of this algorithm is that it is computationally efficient and terminates quickly when it cannot find the solution. The second numerical technique, called the Modified Powell's Algorithm, is based on an algorithm developed by Powell referred to above, and is a hybrid technique that uses the Newton-Raphson method, the gradient descent method, and a combination of the two as will be described below. It is more computationally intensive than the Fixed Point Algorithm, however, the closer the starting point of the algorithm is to the desired solution, the more likely it is that the algorithm will converge to this solution. The Modified Powell's Algorithm is accessed via a Search Algorithm as will be described below that performs a 3 dimensional search in a bounded region that is known to contain the desired solution (i.e. the sphere with radius $\Delta p_{max}$ see equation 10). The values generated by the Search Algorithm serve as inputs to the Modified Powell's Algorithm. It is the Search Algorithm which theoretically guarantees that if the Fixed Point Algorithm fails to find the solution to system (9) then the solution, if it exists, can always be found using the Modified Powell's Algorithm.

In carrying out the present invention a Main Inverse Kinematics Algorithm is used to access the Fixed Point Algorithm and the Search Algorithm. The Main algorithm begins by reading the desired endpoint position and endpoint orientation ($x_{rd}$) (subscript d indicates desired position, etc. as set by the operator) and manipulator configuration (c) of the real manipulator. Next the initial position and orientation of the model manipulator ($x_{mi}$) is set equal to the desired endpoint position and orientation of the real manipulator, i.e. $x_{mi} = x_{rd}$ for the first iteration of the solution.

If $p_{mi} = [p_{mzi}\ p_{myi}\ p_{mxi}]$ (the initial endpoint position of the model manipulator), is outside the workspace of the model manipulator, which is defined as the region of all possible endpoint positions of the model manipulator, then this initial endpoint position is recalculated so that it is close to the desired endpoint position of the real manipulator, while still being within the model manipulator's workspace.

Next the initial joint variables values ($q_i$) and the initial endpoint position of the real manipulator ($p_{ri}$) are calculated using the following relationships:

$$q_i = k_m^{-1}(x_{mi}, c),$$
$$p_{ri} = p_{mi} - \Delta p(q_i). \quad (11)$$

The initial approximation of the desired solution is then set equal to these calculated initial positions; i.e. $p_{ra} = p_{ri}$, $p_{ma} = [p_{maz}\ p_{may}\ p_{max}] = p_{mi}$, and $q_a = q_i$. These initial approximations are passed to the Fixed Point Algorithm. If the Fixed Point Algorithm fails to converge to within the desired maximum error ($E_{max}$), then its best guess and the initial starting position are both passed to the Search Algorithm.

If both the Fixed Point Algorithm and the Search Algorithm fail to converge, then the desired solution is not within the real manipulator's workspace. The algorithm also checks whether joint limits have been exceeded. The maximum possible value of joint variable j is defined by $q_{jmax}$ and the minimum possible value of joint j is given by $q_{jmin}$. If any joint limits have been exceeded then the approximate joint variable values are set to those limits.

The Fixed Point Algorithm

In solving the fixed point algorithm $p_r^k$, $p_m^k$ and $q_k$ respectively are designated to represent the approximation of $p_{rd}$, $p_m$, and $q$ at the $k^{th}$ iteration step. Starting with the initial approximations from the Main Algorithm $p_r^0 = p_{ra}$, $p_m^0 = p_{ma}$ and $q^0 = q_a$, the subsequent estimates of $p_{rd}$, $p_m$, and $q$ are given by the following recursion:

$$\begin{aligned} p_m^{k+1} &= p_{rd} + \Delta p(q^k) \\ p_r^{k+1} &= p_m^k - \Delta p(q^k) \\ q^{k+1} &= k_m^{-1} ([n_{rd}\, s_{rd}\, a_{rd}\, p_m^{k+1}]^T, c) \end{aligned} \quad (12)$$

The algorithm is terminated when any of the following conditions are met:

C1. $\|p_r^{k+1} - p_{rd}\| \leq E_{max}$ where $E_{max}$ is the predefined maximum allowable error. This condition indicates that a solution has been found and the algorithm exits.

C2. $p_m^{k+1} \notin S_m$ This condition indicates that the next approximation is outside the model manipulator's workspace and therefore outside the real manipulators workspace. Thus the iteration is unsuccessful and the algorithm exits.

C3. $\|p_r^{k+1} - p_{rd}\| > \beta_F \cdot \|p_r^k - p_{rd}\|$, where $0 < \beta_F < 1$. This condition indicates that the algorithm is not converging at the desired convergence rate which is predefined by the constant $\beta_F$. Thus the iteration is unsuccessful and the algorithm exits.

C4. $k \geq k_{max}$ is a predefined constant indicating the maximum number of allowable fixed point iteration steps. This indicates that a solution has not been found and the algorithm exits.

The conditions under which the Fixed Point Algorithm will converge to the desired solution are given in E. Zeidler 'Nonlinear Functional Analysis and Its Applications, I: Fixed Point Theorems', Springer-Verlag, New York, N.Y., 1986.

If the Fixed Point Algorithm is not successful the Main Algorithm activates the Search Algorithm which is based on the following:

$$\begin{aligned} f(p_m) &= [f_1(p_m)\, f_2(p_m)\, f_3(p_m)]^T, \\ &= p_m - \Delta p(K_m^{-1}([n_{rd}\, s_{rd}\, a_{rd}\, p_m]^T, c)) - p_{rd}, \\ &= 0. \end{aligned} \quad (13)$$

The goal of the Search Algorithm is to find $p_{ma}$ such that $$E_{max} \geq E\|f(p_{ma})\| = \sqrt{f_1^2 + f_2^2 + f_3^1}$$

The algorithm works by passing a series of different possible starting approximations of $p_m$ to the Modified Powell's Algorithm. The Modified Powell's Algorithm then attempts to solve system (13) from these initial approximations.

The Modified Powell's Algorithm will always iterate to a local minimum. If this local minimum is within $E_{max}$ of $\|f(p_{ma})\| = 0$ where $p_{ma}$ is the current approximation of $p_m$, then the Modified Powell's Algorithm has succeeded in finding the solution. If, however, the algorithm cannot find this solution, then the Search Algorithm passes it a new starting approximation for $p_m$. This process continues until either the Modified Powell's Algorithm converges to the desired solution or the Search Algorithm has generated a point which is within $E_{max}$ of the desired solution. The Search Algorithm is designed so that it does not pass the same initial guess for $p_m$ to the Modified Powell's algorithm more than once.

The Search Algorithm begins by passing $p_{ma}$ (as calculated by the Fixed Point Algorithm), to the Modified Powell's Algorithm. If this initial position fails to allow the Modified Powell's Algorithm to converge to the required solution, then the algorithm resets $p_{ma} = p_{mi}$, and then this initial approximation is also passed to the Modified Powell's Algorithm. If this initial value also fails to give convergence, then a more extensive search of all possible solutions is performed. The more extensive search is termed the second part of the Search Algorithm and continues as will be described below. It should be noted that in most instances the Modified Powell's Algorithm will have converged to the desired solution without the need for this extensive search.

A set of all values of $p_{ma}$ which will allow possible convergence to the desired solution is contained within the region p where $$p = \{p_{ma} \in \Re^3 \text{ such that } p_{ma} \in S_m \text{ AND } \|p_{ma} - p_{mi}\| \leq R_s\}, \quad (15)$$

where $S_m$ is the workspace of the model manipulator, and $R_s$ is chosen so that $$R_s \geq \|p_m - p_{mi}\| \quad (16)$$

Note that p does not contain all possible values of $p_{ma}$ which will allow convergence to the desired solution but only a very small well-contained subset of all possible values. For real manipulators that meet the required conditions described herein, the maximum distance between the endpoint position of the real manipulator and the endpoint position of the model manipulator is given by $$\|p_{rd} - p_m\| \leq |a_{r4}| + \sqrt{d_{r4}^2 + d_{r5}^2} \quad (17)$$

Therefore, $R_s$ is calculated as follows:

$$R_s = |a_{r1}| + \sqrt{d_{r5}^2 + d_{r5}^2} + \|p_{mi} - p_{rd}\|. \quad (18)$$

The second part of the search procedure is done in distinct stages, and each stage is carried out in 2 separate phases. Let n be an integer which indicates the current stage of the Search Algorithm. The first phase of each stage involves scanning of the region defined by (15) for the local minimum which gives the minimum value of the function $E = \|f(p_{ma})\|$. The point at which this best approximation of $p_m$ is found is designated as $p_{min} = [p_{xmin}\ p_{ymin}\ p_{zmin}]$. The corresponding joint variable values and real manipulator endpoint positions are given by $q_{lm}$ and $p_{rim}$ respectively. The scan is always centered at $p_{mi}$ and moves out in a 3 dimensional Cartesian grid which has coordinate axes that are parallel to the base coordinate axis. The base coordinate frame is the one in which the desired endpoint position and orientation of the real manipulator are defined. At stage n, the grid has a spacing of $$i \cdot \frac{1}{2^n} \cdot R_s$$

along each coordinate axis, where i is an odd integer such that $|i| < 2^n$. The first phase of any stage of the Search Algorithm always generates new starting values of $p_{ma}$. Each point generated in the above grid is passed to the Modified Powell's Algorithm. The first phase ends when either the Modified Powell's Algorithm has found a $p_{ma}$ which satisfies equation (14), or all points of the grid have been passed to the Modified Powell's Algorithm. If the desired solution is not found in the first phase, then the second phase is executed.

The function of the second phase of each stage of the Search Algorithm is to search around the best approximation of $p_m$ discovered in the first phase. The second phase is not required to guarantee convergence; its only function is to improve the rate of convergence.

The second phase of the Search Algorithm is centered at $p_{min}$ and moves out in a 3 dimensional Cartesian grid which also has coordinate axes that are parallel to the base coordinate axes. At stage n, the grid has a spacing of $$i \cdot \frac{1}{2^n} \cdot \frac{1}{2^n} \cdot R_s$$

along each coordinate axis, where i is an odd integer such that $|i| < 2^n$. Note that this search is similar to the one done in the first phase except that it is restricted to a much smaller volume, i.e. volume $= (i \cdot R_s/2^n)^3$. As in the first phase, each point generated by this search is passed to the Modified Powell's Algorithm. If at any time during this search a new local minimum is found, the search is continued around this new local minimum. The second phase ends when either the Modified Powell's Algorithm finds the desired solution or all the grid points have been passed to the Modified Powell's Algorithm. If the solution has not been found in the second phase of stage n, then n is incremented and the first phase is executed once more.

The Search Algorithm ends if either of the following two conditions are met:

C1. The Modified Powell's Algorithm is successful. This indicates that the desired solution has been found.

C2. $n > n_{max}$. This condition indicates that the Search Algorithm has generated a sufficiently dense 3 dimensional Cartesian grid to completely cover the region of all possible solutions to within a maximum real manipulator endpoint position error of $E_{max}$. If this condition is met, then it is concluded that the desired solution is outside the real manipualtor's workspace, and the Search Algorithm exits indicating success. Note that $n_{max}$ must be determined in advance either theoretically or experimentally.

The Modified Powell's Algorithm uses 3 types of iterative non-linear techniques for solving systems of non-linear equations. These are the Newton-Raphson method, the Gradient Descent method, and a linear combination of the Newton-Raphson and Gradient Descent methods.

The goal of this algorithm is to find $p_{ma}$ such that $$(\text{error})^2 = F(p_{ma}) = \|f(p_{ma})\|^2 \leq E_{max}^2 \tag{19}$$

where $f(.)$ is defined in equation (13). To use this system $p_r^k$, $p_m^k$ and $q^k$ respectively are designated as representing the approximation of $p_{rd}$, $p_m$, and $q$ at the $k^{th}$ iteration. Starting with the initial guesses (from the Search Algorithm) $p_r^0 = p_{ra}$, $p_m^0 = p_{ma}$ and $q^0 = q_a$, the subsequent estimations of $p_{rd}$, $p_m$, and $q$ are calculated using the following recursion:

$$p_m^{k+1} = p_m^k + \underline{\delta}$$
$$q^{k+1} = k_m^{-1}(p_m^{k+1}, c),$$
$$p_r^{k+1} = p_m^{k+1} - \Delta p(q^{k+1}). \tag{20}$$

The Modified Powell's Algorithm, there are three possible ways of calculating $\underline{\delta}$; the first one that reduces the error by an amount which satisfies $F(p_m^k + \underline{\delta}) < \beta \cdot F(p_m^k)$ (where $0 < \beta < 1$ is a predefined constant that determines the minimum allowable reduction in the total error per iteration step) is used. where
 $\underline{\delta}$ = vector in space
 $\beta$ = real number The Modified Powell's Algorithm first calculates $\underline{\delta}$ using the Newton-Raphson method. This is done by solving the following system of 3 linear equations in 3 unknowns:

$$f(p_m^k) + J^{-1}\underline{\delta} = 0, \tag{21}$$

where J is the 3 by 3 Jacobian matrix of $f(p_m^k)$; i.e.

$$J = \left[ \frac{\partial (f(p_m^k))}{\partial p_m^k} \right]. \tag{22}$$

The magnitude of the step $\underline{\delta}$ is limited to a maximum value defined by $\Delta_{max}$. Initially this is set to $$\Delta_{max} = \sqrt{F(p_m^k)}. \tag{23}$$

If $\|\underline{\delta}\| > \Delta_{max}$ then $\underline{\delta}$ is recalculated as $$\underline{\delta} = \Delta_{max} \frac{\underline{\delta}}{\|\underline{\delta}\|}$$

(note that Powell's original algorithm does not do this recalculation; it simply ignores the Newton-Raphson calculation of $\underline{\delta}$ if its magnitude exceeds $\Delta_{max}$).

If the Newton-Raphson calculation of $\underline{\delta}$ fails to reduce the error by the required amount, then the gradient descent method is used. The gradient of $F(p_m^k)$ is given by $$g = \left[ \frac{\partial F(p_m^k)}{\partial p_{mz}^k} \quad \frac{\partial F(p_m^k)}{\partial p_{my}^k} \quad \frac{\partial F(p_m^k)}{\partial p_{mx}^k} \right]^T, \quad (24)$$

and $\delta$ is calculated as $$\underline{\delta} = -\Delta_{max} \frac{g}{\|g\|}. \quad (25)$$

Finally, if both the Newton-Raphson method and the gradient descent method fail to reduce the error by the required amount, then a linear combination of these two methods is used. This involves finding $\gamma$ such that $$\left\| (1\gamma) \frac{\|g\|}{\|Jg\|} g + \gamma J^{-1} f(p_m^k) \right\| = \Delta_{max}. \quad (26)$$

If such a $\gamma$ is a positive real number between 0 and 1 (i.e. $\gamma \in \mathfrak{R}$ such that $0 \leq \gamma \leq 1$) then $\delta$ is calculated as follows:

$$\underline{\delta} = (1 - \gamma) \frac{\|g\|}{\|Jg\|} g + \gamma J^{-1} f(p_m^k). \quad (27)$$

If such a $\gamma$ does not exist, then the linear combination of the Newton-Raphson method and the gradient descent method has not succeeded in calculating a $\underline{\delta}$.

At each iteration, all calculated $\underline{\delta}$'s are put through a boundary test. These tests are required to ensure that the algorithm is not iterating to points that are outside of the manipulator's workspace. A boundary test is done by checking to see whether $(p_m^k + \underline{\delta})$ is within the region of all possible solutions; i.e. $(p_m^k + \delta) \in S_m$ such that $\| p_m^k + \underline{\delta} - p_{mi} \| \leq R_s$. If it is not, then the magnitude of $\underline{\delta}$ is limited to a distance which is less than the minimum distance between the coundary of all possible solutions and $p_m^k$. This new maximum value of $\| \underline{\delta} \|$ is assigned to the variable $\Delta$. The calculation of $\Delta$ is manipulator dependent. If $\Delta \geq \Delta_{min}$, where $\Delta_{min}$ is a predefined minimum step size that is used to account for computer round off errors, then $\underline{\delta}$ is calculated as $$\underline{\delta} = \Delta_{max} \frac{\delta}{\|\underline{\delta}\|}$$

If $\Delta < \Delta_{min}$ then the direction of $\delta$ is such that it gives points that outside the region of all possible solutions. This error is referred to as a model manipulator boundary error.

If all calculated $\delta$'s do not reduce the error by the required amount, but at least one of them does not produce a model manipulator boundary error, then the algorithm sets $\Delta_{max} = \frac{1}{2}\Delta_{max}$ and the above steps are repeated starting with the Newton-Raphson method. If a successful $\delta$ has been calculated, then the next iteration of the algorithm begins once the recursion (20) is done and the maximum step size is recalculated as $$\Delta_{max} = \sqrt{F(p_m^{k+1})},$$

and k is incremented by 1.

The Modified Powell's Algorithm terminates under the following conditions

C1. $F(p_m^k) \leq .E^2_{max}$. This indicates that a solution has been found and the algorithm exits.

C2. $\Delta_{max} < \Delta_{min}$. This indicates that a local minimum has been found and the algorithm exits.

C3. $k > k_{max}$. This indicates that the Jacobian matrix has been calculated more than the maximum number of allowable times (determined by the predefined integer $k_{max}$).

Figure 5:
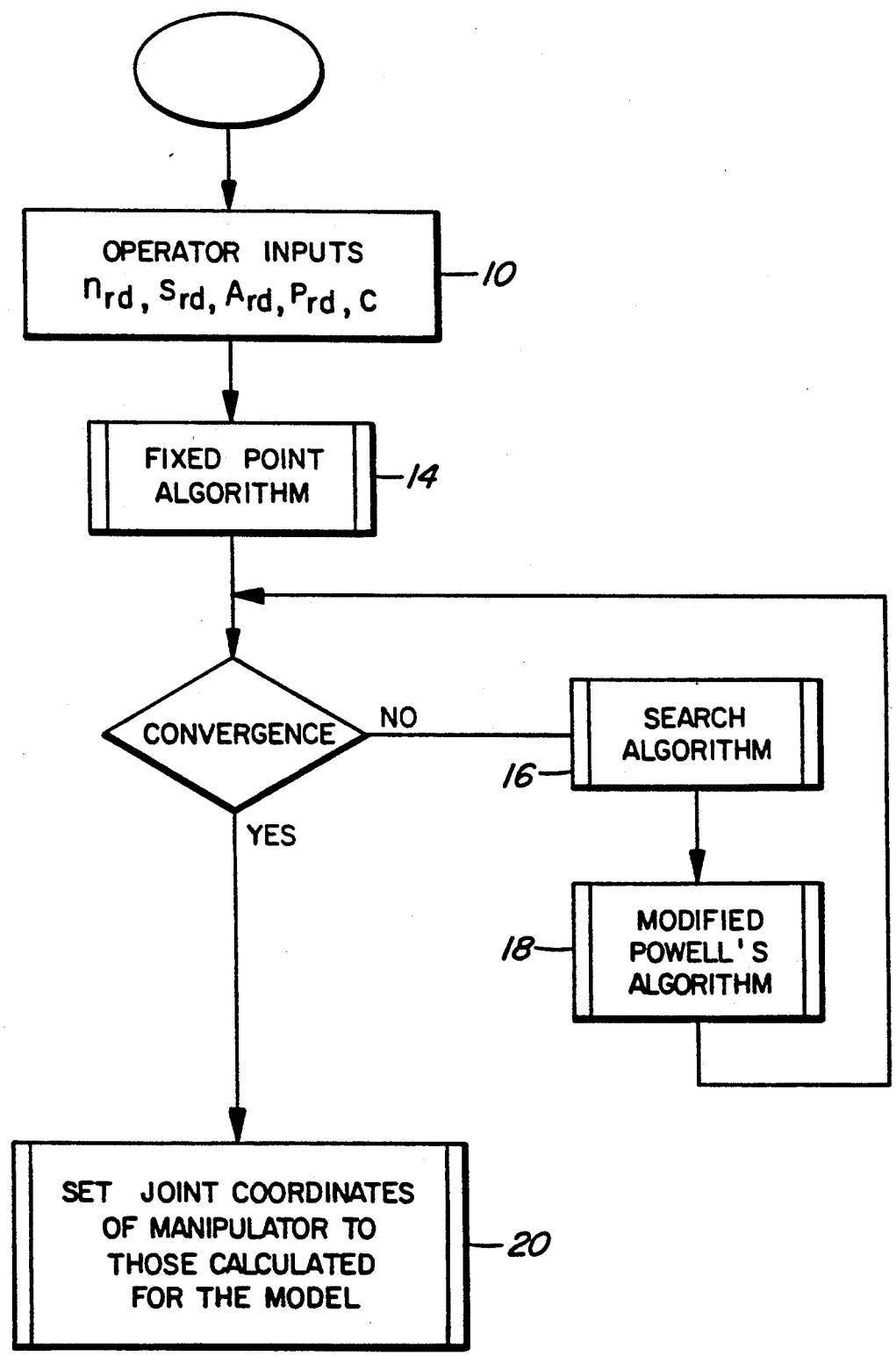
FIG. 5 is a flow diagram of the manipulator control system.

A flow diagram indicating the operation of the present invention is shown in FIG. 5. The operator input at 10 determines the desired position and orientation of the manipulator endpoint. These inputs are used in the Fixed Point Algorithm to determine the joint angles and position of the model manipulator as indicated at 14. If there is convergence by the Fixed Point Algorithm then these joint angles are then forwarded as indicated by the yes line to set the joint variables of the manipulator joints. If there is no convergence the Search Algorithm is initiated as indicated at 60 which provides inputs for the modified Powell Algorithm to define the position or joint variables as indicated at 18 and when there is convergence these joint variables or coordinates of the model are used to set the joint coordinates of the manipulator to move its endpoint to its desired position and orientation as indicated at 20.

EXAMPLE

Figure 6:
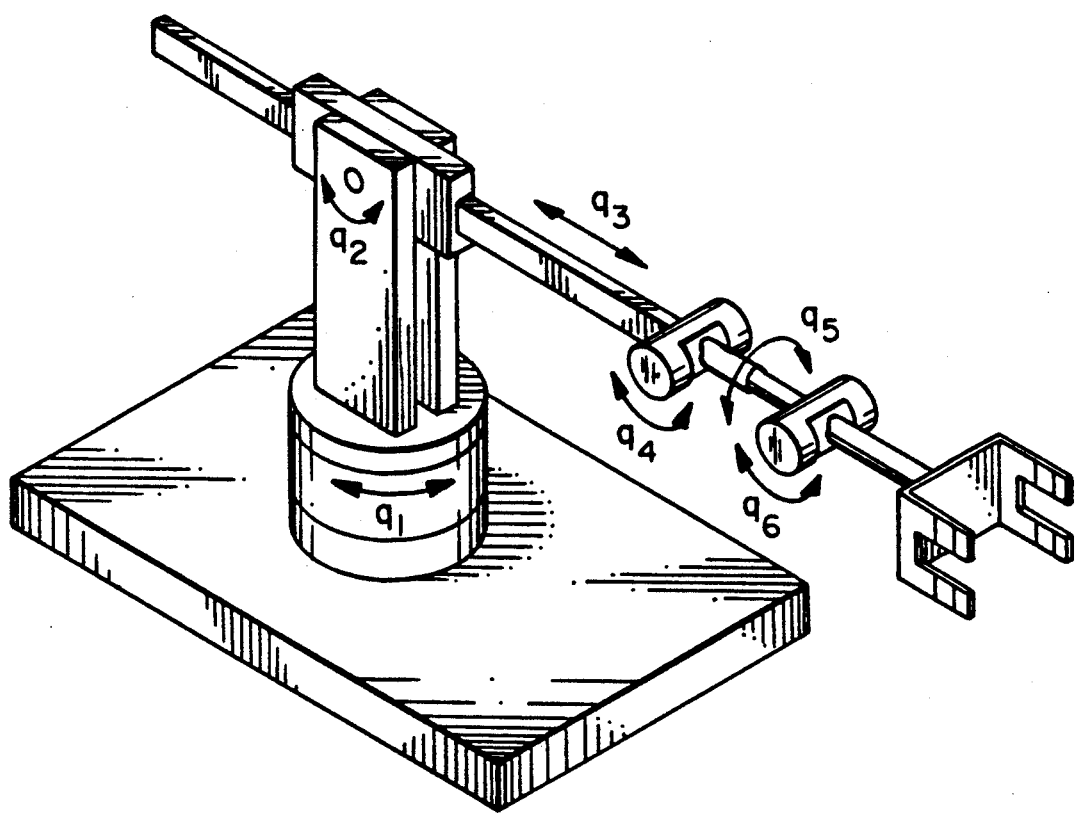
FIG. 6 is a schematic reproduction of a further robot also having 6 DOF.

The present invention was applied to a 6DOF manipulator having no known closed-form inverse kinematics equations called the Spherical manipulator modeled after a manipulator described by Tourassis and Ang (see Tourassis and Ang "A Modular Architecture for Inverse Robot Kinematics" IEEE Trans. Robotics and Automat", 5(5): 555–568, Oct. 1989) who used it to demonstrate their inverse kinematics algorithm (see FIG. 6). Tourassis and Ang tested their algorithm on 24 desired inverse kinematics solutions for this manipulator, their algorithm failed to converge on 4 of these desired solutions. In contrast, the OM method (method of the present invention) combined with the nonlinear equation solver described above was always able to find the desired inverse kinematics solution, if it existed.

To form a model manipulator upon which to base the calculations the link length $d_{m5}$ to zero which defined a model manipulator with closed-form inverse kinematics equations.

The Denavit-Hartenberg Parameters of the 'real' Spherical manipulator (see FIG. 6) are given in Table 1. The Denavit-Hartenberg Parameters of the corresponding model manipulator (which used closed-form inverse kinematics equations) are given in Table 2.

TABLE 1

| Joint i | $\theta_{ri}$ | $\alpha_{ri}$ | $a_{ri}$ | $d_{ri}$ | Joint Range |
|---|---|---|---|---|---|
| 1 | $q_1$ | 90° | 0 | 100.0 mm | 0° ≤ $q_i$ ≤ 360° |
| 2 | $q_2$ | −90° | 15.0 mm | 0 | 0° ≤ $q_2$ ≤ 360° |
| 3 |   | 0° | 0 | $q_3$ | ∞ < $q_3$ < ∞ |
| — | −90° | −90° | 0 | 0 | — |
| 4 | $q_4$ | 90° | 0 | 0 | 0° ≤ $q_4$ ≤ 360° |
| 5 | $q_5$ | 90° | 0 | 20.0 mm | 0° ≤ $q_5$ ≤ 360° |
| 6 | $q_6$ | 0° | 20.0 mm | 0 | 0° ≤ $q_6$ ≤ 360° |

TABLE 2

| Joint i | $\theta_{mi}$ | $\alpha_{mi}$ | $a_{mi}$ | $d_{mi}$ | Joint Range |
|---|---|---|---|---|---|
| 1 | $q_1$ | 90° | 0 | 100.0 mm | 0° ≤ $q_1$ ≤ 360° |
| 2 | $q_2$ | −90° | 15.0 mm | 0 | 0° ≤ $q_2$ ≤ 360° |
| 3 |   | 0° | 0 | $q_3$ | −∞ < $q_3$ ≤ ∞ |

TABLE 2-continued

| Joint i | $\theta_{mi}$ | $\alpha_{mi}$ | $a_{mi}$ | $d_{mi}$ | Joint Range |
|---|---|---|---|---|---|
| — | −90° | −90° | 0 | 0 | — |
| 4 | $q_4$ | 90° | 0 | 0 | 0° ≦ $q_4$ ≦ 360° |
| 5 | $q_5$ | 90° | 0 | 0 | 0° ≦ $q_5$ ≦ 360° |
| 6 | $q_6$ | 0° | 20.0 mm | 0 | 0° ≦ $q_6$ ≦ 360° |

The delta kinematics equations are $$\Delta p(q) = p_r(q) - p_f(q),$$
$$= \begin{bmatrix} d_{r5}(C_1 S_2 S_4 - C_1 C_2 C_3) \\ d_{r5}(S_1 S_2 S_4 - S_1 C_2 C_3) \\ d_{r5}(-C_2 S_4 - S_2 C_4) \end{bmatrix}$$

The notation $C_i = \cos q_i$, $S_i = \sin q_i$ is being used.

The closed-form inverse kinematics equations of the model Spherical manipulator are as follows;

$$q_1 = a\tan2\left[\frac{\text{ARM} \cdot p_y}{\text{ARM} \cdot p_x}\right],$$

$$q_2 = a\tan2\left[\frac{a_{m2}b + \text{ELBOW} \cdot a\sqrt{a^2 + b^2 - a_{m2}}}{a_{m2}a - \text{ELBOW} \cdot b\sqrt{a^2 + b^2 - a_{m2}}}\right],$$

$$q_3 = \begin{cases} \dfrac{b - a_{m2}\sin q_2}{\cos q_2}, & \text{if } \cos q_2 \neq 0 \\ \dfrac{a - a_{m2}\cos q_2}{-\sin q_2}, & \text{otherwise,} \end{cases}$$

$$q_4 = a\tan2\left[\frac{\text{WRIST} \cdot A_y}{\text{WRIST} \cdot A_x}\right],$$

$$q_5 = a\tan2\left[\frac{\text{WRIST} \cdot \sqrt{1 - A_z^2}}{-A_z}\right],$$

$$q_6 = a\tan2\left[\frac{-\text{WRIST} \cdot O_z}{\text{WRIST} \cdot N_z}\right],$$

where $p_x = p_{mx} - a_{m6} n_{mx}$ $p_y = p_{my} - a_{m6} n_{my}$ $p_z = p_{mz} - a_{m6} n_{mz}$ $a = p_x \cos q_1 + p_y \sin q_1$ $b = p_x - d_{m1}$ $A_x = (-\sin q_1 \cos q_2) a_{rdx} + (-\sin q_1 \sin q_2) a_{rdy} + (\cos q_2) a_{rdz}$ $A_y = (-\cos q_1 \cos q_2) a_{rdx} + (-\sin q_1 \cos q_2) a_{rdy} + (-\sin q_2) a_{rdz}$ $A_z = (\sin q_1) a_{rdx} + (-\cos q_1) a_{rdy}$ $O_z = (\sin q_1) s_{rdx} + (-\cos q_1) s_{rdy}$ $N_z = (\sin q_1) n_{rdx} + (-\cos q_1) n_{rdx}$ The function atan2 returns the value of $$\tan^{-1}\left(\frac{y}{x}\right)$$

adjusted for the appropriate quadrant. Thus $$q = a\tan2\left[\frac{y}{x}\right] = \begin{cases} 0° \leq q \leq 90° & \text{for } +x \wedge +y \\ 90° \leq q \leq 180° & \text{for } -x \wedge +y \\ -180° \leq q \leq -90° & \text{for } -x \wedge -y \\ -90° \leq q \leq 0° & \text{for } +x \wedge -y \end{cases}$$

Note that the configuration vector is c=[ARM ELBOW WRIST].

The manipulator singularities are handled as follows:
1. If $p_x = p_y = 0$, then $q_1$ retains its previous value and the rest of the joint variables are calculated as defined above.
2. If, in addition to the above singularity, $p_z = d_{m1}$, then both $q_1$ and $q_2$ retain their previous values and the rest of the joint variables are calculated as defined above.
3. If $A_x = A_y = 0$, then $q_4$ retains its previous value and $$q_5 = 180°, q_6 = -q_4 + a\tan2\left(\frac{O_x}{-N_x}\right), \text{if } A_z = 1,$$

or $$q_5 = 0°, q_6 = q_4 - a\tan2\left(\frac{O_x}{N_x}\right), \text{if } A_z = -1,$$

where $O_x = (-\sin q_1 \cos q_2) s_{rdx} + (-\sin q_1 \sin q_2) s_{rdy} + (\cos q_2) s_{rdz}$ $N_x = (-\sin q_1 \cos q_2) n_{rdx} + (-\sin q_1 \sin q_2) n_{rdy} + (\cos q_2) n_{rdz}$ The 8 possible manipulator configurations are defined by ARM = + or −1, ELBOW = + or −1, and WRIST = + or −1.

Having described the invention modifications will be evident to those skilled in the art without departing from the spirit of the invention as defined in the appended claims.

We claim:

1. A method of controlling a manipulator having arm segments interconnected by joints, comprising modifying offset values of selected of said arm segments to define a model of said manipulator for which it is possible to derive closed-form inverse kinematics equations for solving the joint variables for said model, deriving closed-form inverse kinematics equations for said model, developing from said derived closed-form inverse kinematics equations a system of not more than 3 non-linear equations in not more than 3 unknowns which when solved give an inverse kinematics solution for the model, solving said system of not more than 3 non-linear equations to calculate the inverse kinematic solution for said joint variables of said model, and adjusting said joints of said manipulator to correspond with said joint variables calculated for said model.

2. An inverse kinematics method for defining joint variables for a manipulator as defined in claim 1 wherein said modifying of said offset length values of said arm segments comprises setting said offset length values of said selected arm segments to zero to define said model.

3. A method as defined in claim 2 wherein said solving iteratively solves for $p_m$ (model end point position) within a sphere centered at $p_{rd}$ (target end point position of the manipulator) having a radius $\Delta p_{max}$ $$\Delta p_{max} = \max_q \{||\Delta p(q,c)||\} \tag{10}$$

where
  q = a vector containing the joint variable values of the manipulator,
  c = represents the manipulator configuration,
  $\Delta p$ = difference between the endpoint position of the model manipulator and the real manipulator given that both have identical joint angle values.

4. A method as defined in claim 3 wherein said system of 3 non-linear equations in 3 unknowns is $$p_m = [p_{mx} p_{my} p_{mz}] = p_{rd} + \Delta p(k_m^{-1}([n_{rd} s_{rd} a_{rd} p_m]^T, c))$$

where
  $p_m$ = endpoint position of the model manipulator when the real and model manipulators have the same joint values
  $k_m^{-1}$ = the closed form inverse kinematics equivalent of the model manipulators
  $n = [n_x \, n_y \, n_z]$
  $s = [s_x \, s_y \, s_z]$
  $a = [a_x \, a_y \, a_z]$ and
  n, s and a = orthonormal vectors which uniquely define the orientation of the manipulator's distal link
  $p_{rd} = [p_{rx} \, p_{ry} \, p_{rz}]$ the desired Cartesian endpoint position of the real manipulator
  c = vector defining the desired arm configuration
  subscript m = model manipulator values, and
  subscript r = real manipulator values
  subscript d = desired or target values as set by input command
  $\Delta p$ = difference between the endpoint position of the model manipulator and the real manipulator given that both have identical joint angle values.

5. A method as defined in claim 3 wherein said manipulator is a 6 DOF manipulator not having a closed-form solution and in which all the distal joints 4, 5 and 6 are
  a) rotational
  b) non-parallel (i.e. $a_{r4} \neq 0°$ or $\pm 180°$ and $a_{r5} \neq 0°$ or $\pm 180°$))
and wherein said model has
  a) joint variables for joints i = 1, 2 and 3 (starting with joint 1 at the base) give three degrees of freedom for the Cartesian positioning of joint 4
  b) joints i = 1, 2, 3 and 6 are set on the basis that Denavit-Hartenberg joint parameters of said model equal those of said manipulator ($a_{mi} = a_{ri}$, $a_{mi} = a_{ri}$, $d_{mi} = d_{ri}$, and $\theta_{mi} = \theta_{ri}$) and
  c) Denavit-Hartenberg joint parameters for joints i = 4 and 5 are set so that $$a_{mi} = a_{ri}; \qquad a_{mi} = 0;$$

$$d_{mi} = \begin{cases} d_{ri} & i = 4 \\ 0 & i = 5 \end{cases} \qquad \theta_{mi} = \theta_{ri}.$$

6. A method as defined in claim 2 wherein said manipulator has 6 degrees of freedom and wherein said model manipulator has 6 degrees of freedom and is defined with three adjacent joint axes intersecting.

7. A method as defined in claim 6 wherein said system of 3 non-linear equations in 3 unknowns is $$p_m = [p_{mx} p_{my} p_{mz}] = p_{rd} + \Delta p(k_m^{-1}([n_{rd} s_{rd} a_{rd} p_m]^T, c))$$

where
  $P_m$ = endpoint position of the model manipulator when the real and model manipulators have the same joint values
  $k_m^{-1}$ = the closed form inverse kinematics equivalent of the model manipulators
  $n = [n_x n_y n_z]$
  $s = [s_x s_y s_z]$
  $a = [a_x a_y a_z]$ and
  n, s and a = orthonormal vectors which uniquely define the orientation of the manipulator's distal link
  $p_{rd} = [p_{rx} p_{ry} p_{rz}]$ the desired Cartesian endpoint position of the real manipulator
  c = vector defining the desired arm configuration
  subscript m = model manipulator values, and
  subscript r = real manipulator values
  subscript d = desired or target values as set by input command
  $\Delta p$ = difference between the endpoint position of the model manipulator and the real manipulator given that both have identical joint angle values.

8. A method as defined in claim 2 wherein said system of 3 non-linear equations in 3 unknowns is $$p_m = [p_{mx} p_{my} p_{mz}] = p_{rd} + \Delta p(k_m^{-1}([n_{rd} s_{rd} a_{rd} p_m]^T, c))$$

where
  $p_m$ = endpoint position of the model manipulator when the real and model manipulators have the same joint values
  $k_m^{-1}$ = the closed form inverse kinematics equivalent of the model manipulators
  $n = [n_x n_y n_z]$
  $s = [s_x s_y s_z]$
  $a = [a_x a_y a_z]$ and
  n, s and a = orthonormal vectors which uniquely define the orientation of the manipulator's distal link
  $p_{rd} = [p_{rx} p_{ry} p_{rz}]$ the desired Cartesian endpoint position of the real manipulator
  c = vector defining the desired arm configuration
  subscript m = model manipulator values, and
  subscript r = real manipulator values
  subscript d = desired or target values as set by input command
  $\Delta p$ = difference between the endpoint position of the model manipulator and the real manipulator given that both have identical joint angle values.

9. A method as defined in claim 2 wherein said manipulator is a 6 DOF manipulator not having a closed-form solution and in which all the distal joints 4, 5 and 6 are
  a) rotational b) non-parallel (i.e. $a_{r4} \neq 0°$ or $\pm 180°$ and $a_{r5} \neq 0°$ or $\pm 180°$))

and wherein said model has a) joint variables for joints i=1, 2 and 3 (starting with joint 1 at the base) give three degrees of freedom for the Cartesian positioning of joint 4 b) joints i=1, 2, 3 and 6 are set on the basis that Denavit-Hartenberg joint parameters of said model equal those of said manipulator ($a_{mi}=a_{ri}$; $a_{mi}=a_{ri}$; $d_{mi}=d_{ri}$; and $\theta_{mi}=\theta_{ri}$) and c) Denavit-Hartenberg joint parameters for joints i=4 and 5 are set so that $$a_{mi} = a_{ri}; \quad a_{mi} = 0;$$

$$d_{mi} = \begin{cases} d_{ri} & i = 4 \\ 0 & i = 5 \end{cases} \quad \theta_{mi} = \theta_{ri}.$$

10. A method as defined in claim 1 wherein said solving iteratively solves for $P_m$ (model end point position) within a sphere centered at $P_{rd}$ (target end point position of the manipulator) having a radius $\Delta P_{max}$ $$\Delta p_{max} = \max_q \{||\Delta p(q,c)||\} \tag{10}$$

where q = a vector containing the joint variable values of the manipulator c = represents the manipulator configuration $\Delta p$ = difference between the endpoint position of the model manipulator and the real manipulator given that both have identical joint angle values.

11. A method as defined in claim 10 wherein said manipulator has 6 degrees of freedom and wherein said model manipulator has 6 degrees of freedom and is defined with three adjacent joint axes intersecting.

12. A method as defined in claim 11, wherein said system of 3 non-linear equations in 3 unknowns is $$P_m = [P_{mx} P_{my} P_{mz}] = P_{rd} + \Delta p(k_m^{-1}([n_{rd} s_{rd} a_{rd} P_m]^T, c))$$

where $P_m$ = endpoint position of the model manipulator when the real and model manipulators have the same joint values $k_m^{-1}$ = the closed form inverse kinematics equivalent of the model manipulators $n = [n_x\ n_y\ n_z]$ $s = [s_x\ s_y\ s_z]$ $a = [a_x\ a_y\ a_z]$ and n, s and a = orthonormal vectors which uniquely define the orientation of the manipulator's distal link $P_{rd} = [P_{rx}\ P_{ry}\ P_{rz}]$ the desired Cartesian endpoint position of the real manipulator c = vector defining the desired arm configuration subscript m = model manipulator values, and subscript r = real manipulator values subscript d = desired or target values as set by input command $\Delta p$ = difference between the endpoint position of the model manipulator and the real manipulator given that both have identical joint angle values.

13. A method as defined in claim 10 wherein said system of 3 non-linear equations in 3 unknowns is $$P_m = [P_{mx} P_{my} P_{mz}] = P_{rd} + \Delta p(k_m^{-1}([n_{rd} s_{rd} a_{rd} P_m]^T, c))$$

where $P_m$ = endpoint position of the model manipulator when the real and model manipulators have the same joint values $k_m^{-1}$ = the closed form inverse kinematics equivalent of the model manipulators $n = [n_x\ n_y\ n_z]$ $s = [s_x\ s_y\ s_z]$ $a = [a_x\ a_y\ a_z]$ and n, s and a = orthonormal vectors which uniquely define the orientation of the manipulator's distal link $P_{rd} = [P_{rx}\ P_{ry}\ P_{rz}]$ the desired Cartesian endpoint position of the real manipulator c = vector defining the desired arm configuration subscript m = model manipulator values, and subscript r = real manipulator values subscript d = desired or target values as set by input command $\Delta p$ = difference between the endpoint position of the model manipulator and the real manipulator given that both have identical joint angle values.

14. A method as defined in claim 10 wherein said manipulator is a 6 DOF manipulator not having a closed-form solution and in which all the distal joints 4, 5 and 6 are a) rotational b) non-parallel (i.e. $a_{r4} \neq 0°$ or $\pm 180°$ and $a_{i5} \neq 0°$ or $\pm 180°$))

and wherein said model has a) joint variables for joints i=1, 2 and 3 (starting with joint 1 at the base) give three degrees of freedom for the Cartesian positioning of joint 4 b) joints i=1, 2, 3 and 6 are set on the basis that Denavit-Hartenberg joint parameters of said model equal those of said manipulator ($a_{mi}=a_{ri}$; $a_{mi}=a_{ri}$; $d_{mi}=d_{ri}$; and $\theta_{mi}=\theta_{ri}$) and c) Denavit-Hartenberg joint parameters for joints i=4 and 5 are set so that $$a_{mi} = a_{ri}; \quad a_{mi} = 0;$$

$$d_{mi} = \begin{cases} d_{ri} & i = 4 \\ 0 & i = 5 \end{cases} \quad \theta_{mi} = \theta_{ri}.$$

15. A method as defined in claim 1 wherein said manipulator has 6 degrees of freedom and wherein said model manipulator has 6 degrees of freedom and is defined with three adjacent joint axes intersecting.

16. A method as defined in claim 15 wherein said manipulator has 6 degrees of freedom and wherein said model manipulator has 6 degrees of freedom and is defined with three adjacent joint axes intersecting.

17. A method as defined in claim 16 wherein said system of 3 non-linear equations in 3 unknowns is $$p_m = [p_{mx} p_{my} p_{mz}] = p_{rd} + \Delta p(k_m^{-1}([n_{rd} s_{rd} a_{rd} p_m]^T, c))$$

where $p_m$ = endpoint position of the model manipulator when the real and model manipulators have the same joint values, $k_m^{-1}$ = the closed form inverse kinematics equivalent of the model manipulators $n = [n_x n_y n_z]$ $s = [s_x s_y s_z]$ $a = [a_x a_y a_z]$ and n, s and a = orthonormal vectors which uniquely define the orientation of the manipulator's distal link $p_{rd} = [p_{rx} p_{ry} p_{rz}]$ the desired Cartesian endpoint position of the real manipulator c = vector defining the desired arm configuration subscript m = model manipulator values, and subscript r = real manipulator values subscript d = desired or target values as set by input command $\Delta p$ = difference between the endpoint position of the model manipulator and the real manipulator given that both have identical joint angle values.

18. A method as defined in claim 15 wherein said system of 3 non-linear equations in 3 unknowns is $$p_m = [p_{mx} p_{my} p_{mz}] = p_{rd} + \Delta p(k_m^{-1}([n_{rd} s_{rd} a_{rd} p_m]^T, c))$$

where $p_m$ = endpoint position of the model manipulator when the real and model manipulators have the same joint values $k_m^{-1}$ = the closed form inverse kinematics equivalent of the model manipulators $n = [n_x n_y n_z]$ $s = [s_x s_y s_z]$ $a = [a_x a_y a_z]$ and n, s and a = orthonormal vectors which uniquely define the orientation of the manipulator's distal link $p_{rd} = [p_{rx} p_{ry} p_{rz}]$ the desired Cartesian endpoint position of the real manipulator c = vector defining the desired arm configuration subscript m = model manipulator values, and subscript r = real manipulator values subscript d = desired or target values as set by input command $\Delta p$ = difference between the endpoint position of the model manipulator and the real manipulator given that both have identical joint angle values.

19. A method as defined in claim 1 wherein said system of 3 non-linear equations in 3 unknowns is $$p_m = [p_{mx} p_{my} p_{mz}] = p_{rd} + \Delta p(k_m^{-1}([n_{rd} s_{rd} a_{rd} p_m]^T, c))$$

where $p_m$ = endpoint point position of the model manipulator when the real and model manipulators have the same joint values $k_m^{-1}$ = the closed form inverse kinematics equivalent of the model manipulators $n = [n_x n_y n_z]$ $s = [s_x s_y s_z]$ $a = [a_x a_y a_z]$ and n, s and a = orthonormal vectors which uniquely define the orientation of the manipulator's distal link $p_{rd} = [p_{rx} p_{ry} p_{rz}]$ the desired Cartesian endpoint position of the real manipulator c = vector defining the desired arm configuration subscript m = model manipulator values, and subscript r = real manipulator values subscript d = desired or target values as set by input command $\Delta p$ = difference between the endpoint position of the model manipulator and the real manipulator given that both have identical joint angle values.

20. A method as defined in claim 1 wherein said manipulator is a 6 DOF manipulator not having a closed-form solution and in which all the distal joints 4, 5 and 6 are a) rotational b) non-parallel (i.e. $\alpha_{r4} \neq 0°$ or $\pm 180°$ and $\alpha_{r5} \neq 0°$ or $\pm 180°$))

and wherein said model has a) joint variables for joints i = 1, 2 and 3 (starting with joint 1 at the base) give three degrees of freedom for the Cartesian positioning of joint 4 b) joints i = 1, 2, 3 and 6 are set on the basis that Denavit-Hartenberg joint parameters of said model equal those of said manipulator ($\alpha_{mi} = \alpha_{ri}$; $a_{mi} = a_{ri}$; $d_{mi} = d_{ri}$; and $\theta_{mi} = \theta_{ri}$) and c) Denavit-Hartenberg joint parameters for joints i = 4 and 5 are set so that $$\alpha_{mi} = \alpha_{ri}; \quad a_{mi} = 0;$$

$$d_{mi} = \begin{cases} d_{ri} & i = 4 \\ 0 & i = 5 \end{cases} \quad \theta_{mi} = \theta_{ri}.$$

* * * * *